D. ALLARD.
MACHINE FOR ROLLING RAW COTTON INTO SHEETS.
APPLICATION FILED OCT. 28, 1915.
1,225,099.
Patented May 8, 1917.
2 SHEETS—SHEET 1.
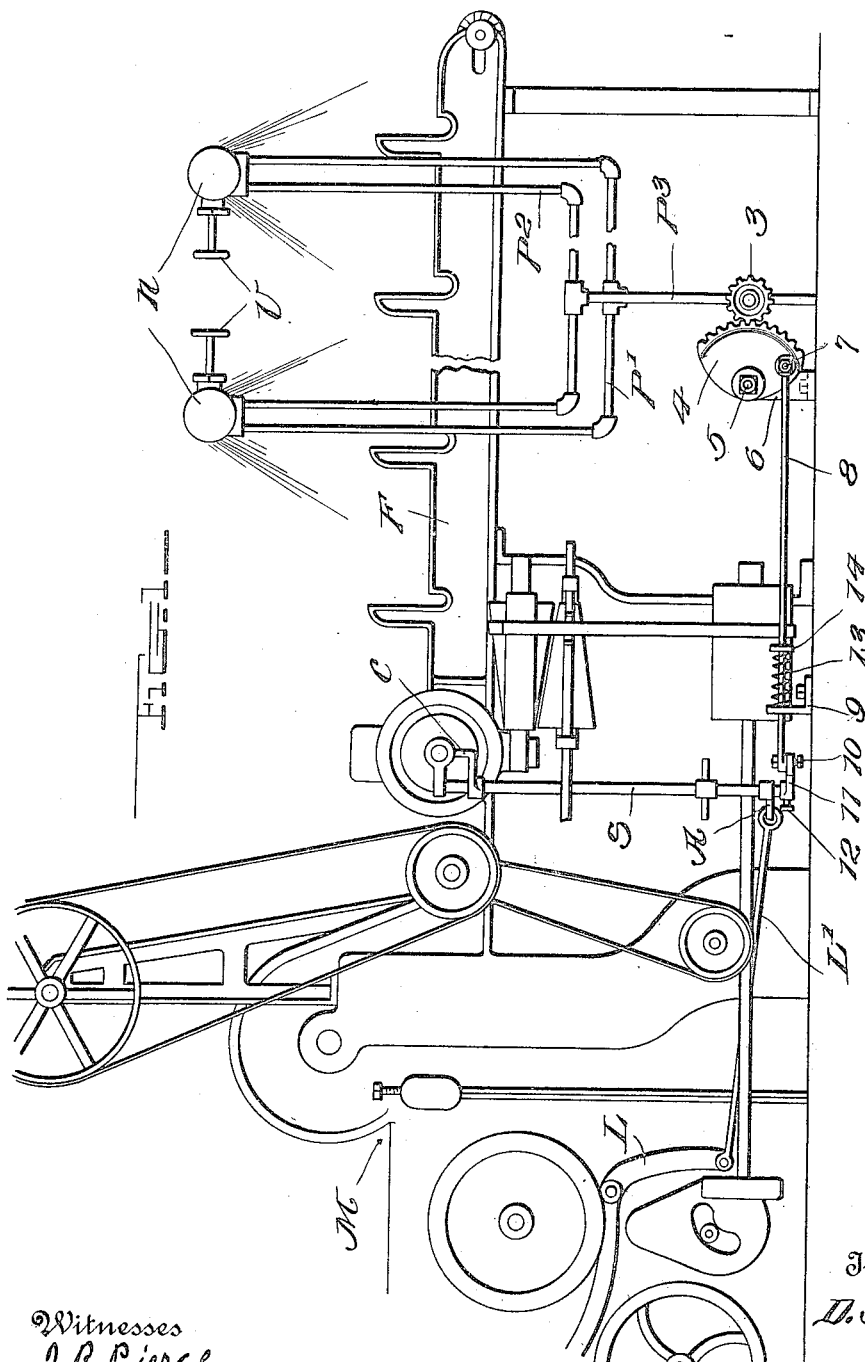

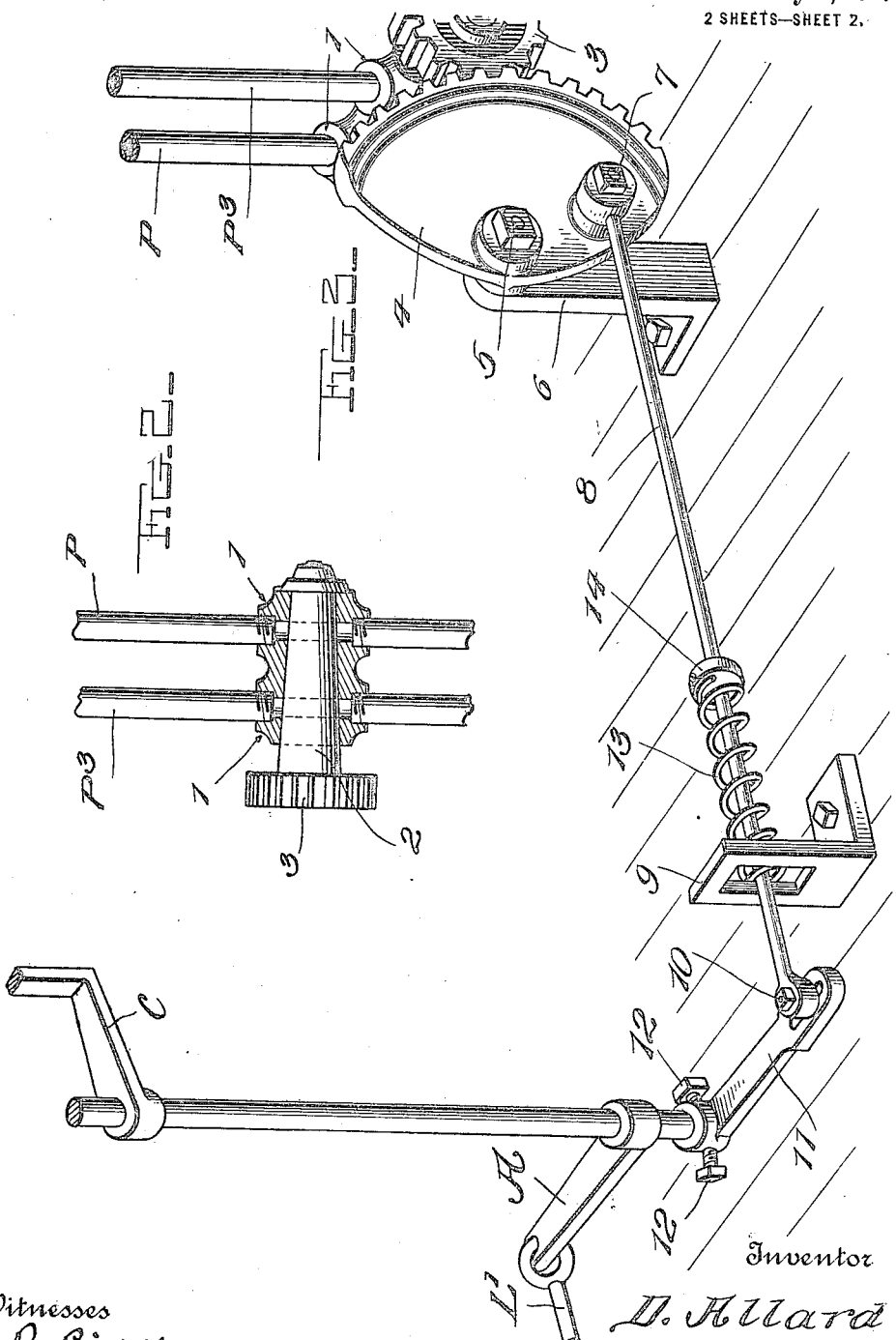

UNITED STATES PATENT OFFICE.

DOMINIQUE ALLARD, OF MANCHESTER, NEW HAMPSHIRE.

MACHINE FOR ROLLING RAW COTTON INTO SHEETS.

1,225,099. Specification of Letters Patent. Patented May 8, 1917.

Application filed October 28, 1915. Serial No. 58,516.

*To all whom it may concern:*

Be it known that I, DOMINIQUE ALLARD, a citizen of the United States, residing at Manchester, in the county of Hillsborough and State of New Hampshire, have invented certain new and useful Improvements in Machines for Rolling Raw Cotton into Sheets; and I do declare the following to be a full, clear, and exact description of the invention, such as will enable others skilled in the art to which it appertains to make and use the same.

My invention relates to improvements in machines used in rolling raw cotton into sheets, in which form it is commonly placed on the market. In the rolling process, it is necessary to moisten the raw cotton, this being usually done by a spray nozzle placed above the feeder of the machine, but if the latter be stopped and the nozzle be allowed to continue sprinkling the cotton, the result is that some of such cotton will become so soaked with water as to prevent proper working of the machine. It is therefore the object of my invention to provide simple and efficient means for preventing operation of the spray nozzle when the machine is stopped.

With this general object in view, the invention resides in certain novel features of construction and in unique combinations of parts to be hereinafter fully described and claimed, the descriptive matter being supplemented by the accompanying drawings wherein:

Figure 1 is a diagrammatic side elevation of a cotton rolling machine, showing the application of the invention thereto;

Fig. 2 is a detail vertical section through the valves of the water and air pipes to be described; and Fig. 3 is a perspective view of the invention and the parts with which it coöperates.

In specifically describing the invention reference will be made to the figures above briefly described by similar reference characters placed on corresponding parts throughout the several views. To this end, M indicates a common type of machine used for rolling raw cotton into sheets, such machine being fed by an appropriate feeder F usually in the form of an endless belt conveyer traveling in an appropriate frame. The cotton conveyed to the machine upon the feeder F is dampened by a pair of appropriate nozzles N to which water is supplied through a U-pipe P' from the main pipe P, the water being forced from the nozzles N by compressed air fed to such nozzles through a U-pipe P² from a main pipe line P³. The usual cut off valves V are provided for preventing the discharge of water from the nozzles N, but it is often impossible to operate such valves simultaneously with stopping the machine. The invention therefore contemplates the application of additional cut off valves in the pipes P and P³ and connecting means between said additional valves and the clutch operating means on the machine.

Before describing the improved features, it may be well to state that the machine M is equipped with an upright rock shaft S rocked at will by an appropriate hand lever L through the instrumentality of a connecting link L' pivoted to a crank arm A on the lower end of the shaft, such arm having connection with the clutch of the machine at C.

The additional valves in the pipes P and P³ are indicated in the drawings by the numerals 1, being mounted upon a single stem or shaft 2 which, when turned, will simultaneously close or open both valves, according to the direction of its rotation. One end of the shaft 2 is equipped with a pinion 3 meshing with a multiplying gear segment 4, the latter being mounted for vertical oscillation on a stub shaft or the like 5 projecting laterally from an appropriate bracket 6 which is secured to the floor upon which the machine M rests. Pivoted eccentrically at 7 to the segment 4, is a horizontal connecting rod 8 which passes slidably through a slotted bracket 9 and is pivoted at 10 to an additional crank arm 11 secured by set screws or the like 12 to the lower end of the upright shaft S. Preferably, a coil spring 13 is interposed between the bracket 9 and a thrust collar 14 on the rod 8, whereby to normally hold the segment 4 in such a position as to retain the valves 1 in open position, said spring also assisting in returning all parts to normal position when starting the machine after stopping the same. When, however, the hand lever L is actuated to rock the shaft S to throw out the clutch of the machine, the crank arm 11 is swung laterally, thereby shifting the rod 8 in a lengthwise direction and rocking the segment 4, the result being that the latter will turn the pinion 3 an appropriate amount for closing the two valves 1. It may be here explained that the movement of the rock shaft S to throw the clutch C out of operation is very slight. By employing the multiplying segment 4 and the pinion 3, however, the movement is so increased as to permit turning of the shaft 2 to the proper amount.

By the construction and arrangement of parts above described, or by similar arrangements, it will be obvious that the nozzles N will be thrown out of use simultaneously with the stopping of the machine. Excessive dampening of any particular area of the raw cotton being fed to the machine is thereby prevented and thus the latter may operate more effectively than when the numerous valves V must be manually closed after throwing the clutch out.

In the drawings, certain specific details of construction have been shown for illustrative purposes, and in the preceding such details have been described, but obviously, numerous changes may be made within the scope of the invention as claimed.

I claim:—

1. The combination with a feeder having a rock shaft for controlling its movement, a sprinkler for moistening the material handled by said feeder, and a rotary valve for controlling the flow of liquid to said sprinkler; of a crank arm projecting from the lower end of the shaft and having a longitudinal slot at its outer end, a horizontal rod having at one end a vertical projection received slidably in said slot, a guide bracket through which said rod passes slidably, a pinion secured on the aforesaid valve, a multiplying gear segment in mesh with said pinion and pivotally connected at an eccentric point with the aforesaid rod, whereby movement of said rod by the slight rotation of the rock shaft in stopping or starting the feeder will sufficiently turn the valve to respectively close or open the same, a stop on said rod, and a coiled spring interposed between said stop and the aforesaid guide bracket, said spring serving to yieldably retain all parts in normal position and assisting in returning said parts to this position when again starting the machine after stopping the latter.

2. In combination, a conveyer, a clutch for stopping and starting said conveyer, a rock shaft having a restricted amount of movement for throwing said clutch in and out, a spraying device for moistening the material handled by the conveyer, a rotary valve for cutting off and turning on the liquid supply of said device, a crank arm extending laterally from said rock shaft, a pinion secured to said valve, a multiplying gear segment meshing with said pinion, and a rod pivoted to said crank arm at one end and to an eccentric point of the segment at its other end.

In testimony whereof I have hereunto set my hand in presence of two subscribing witnesses.

DOMINIQUE ALLARD.

Witnesses:
F. G. HARBOUR,
JOHN W. S. JOYAL.

Copies of this patent may be obtained for five cents each, by addressing the "Commissioner of Patents, Washington, D. C."